United States Patent [19]
Garrison

[11] 4,444,409
[45] Apr. 24, 1984

[54] OSCILLATOR LIMIT IN ARTICULATED LAND VEHICLE

[75] Inventor: Harold K. Garrison, Newton, Kans.

[73] Assignee: Hesston Corporation, Hesston, Kans.

[21] Appl. No.: 402,147

[22] Filed: Jul. 26, 1982

[51] Int. Cl.$^3$ ............................................. B62D 53/02
[52] U.S. Cl. ................................... 280/492; 180/139; 180/235; 280/400
[58] Field of Search .............. 280/492, 494, 495, 496, 280/497, 498, 499, 500, 501, 502, 503, 504, 400, 403; 180/139, 235

[56] References Cited

U.S. PATENT DOCUMENTS

| | | | |
|---|---|---|---|
| 3,342,282 | 9/1967 | Forpahl | 180/235 |
| 4,034,822 | 7/1977 | Stedman | 280/492 X |
| 4,200,306 | 4/1980 | Helms | 280/494 |
| 4,235,308 | 11/1980 | Davis | 280/492 X |
| 4,245,714 | 1/1981 | Kersey | 280/492 X |
| 4,290,622 | 9/1981 | Horvath | 280/400 |
| 4,398,617 | 8/1983 | Crabb et al. | 180/235 |

Primary Examiner—Joseph F. Peters, Jr.
Assistant Examiner—Mitchell J. Hill
Attorney, Agent, or Firm—Schmidt, Johnson, Hovey & Williams

[57] ABSTRACT

A self-propelled farm implement has independent front and rear, wheel supported frames articulated therebetween for execution of turns by operator steering of the front frame from within a cab that is, in turn, mounted on the front frame. The rear frame carries a crop receiving bin which, except for my oscillator limit incorporated in the combination, would be engaged by the cab under certain unlevel ground conditions, causing substantial damage. The front frame is tiltable about a fore and aft axis within a range defined by interengageable stops between the front frame and its coupling link. The stops on the front link are in the form of pivoted members which abut lugs on the rear frame causing the members to swing about their pivots during turning movements. The effect is to progressively limit the extent of tilt as full turns are approached to prevent cab-bin interengagement regardless of the nature of ground contour as the vehicle is steered off a straight path of travel. In the event, intermediate the turning movements, the front frame has reached its maximum tilt, further turning is precluded which also prevents damage to equipment carried by the frames.

9 Claims, 8 Drawing Figures

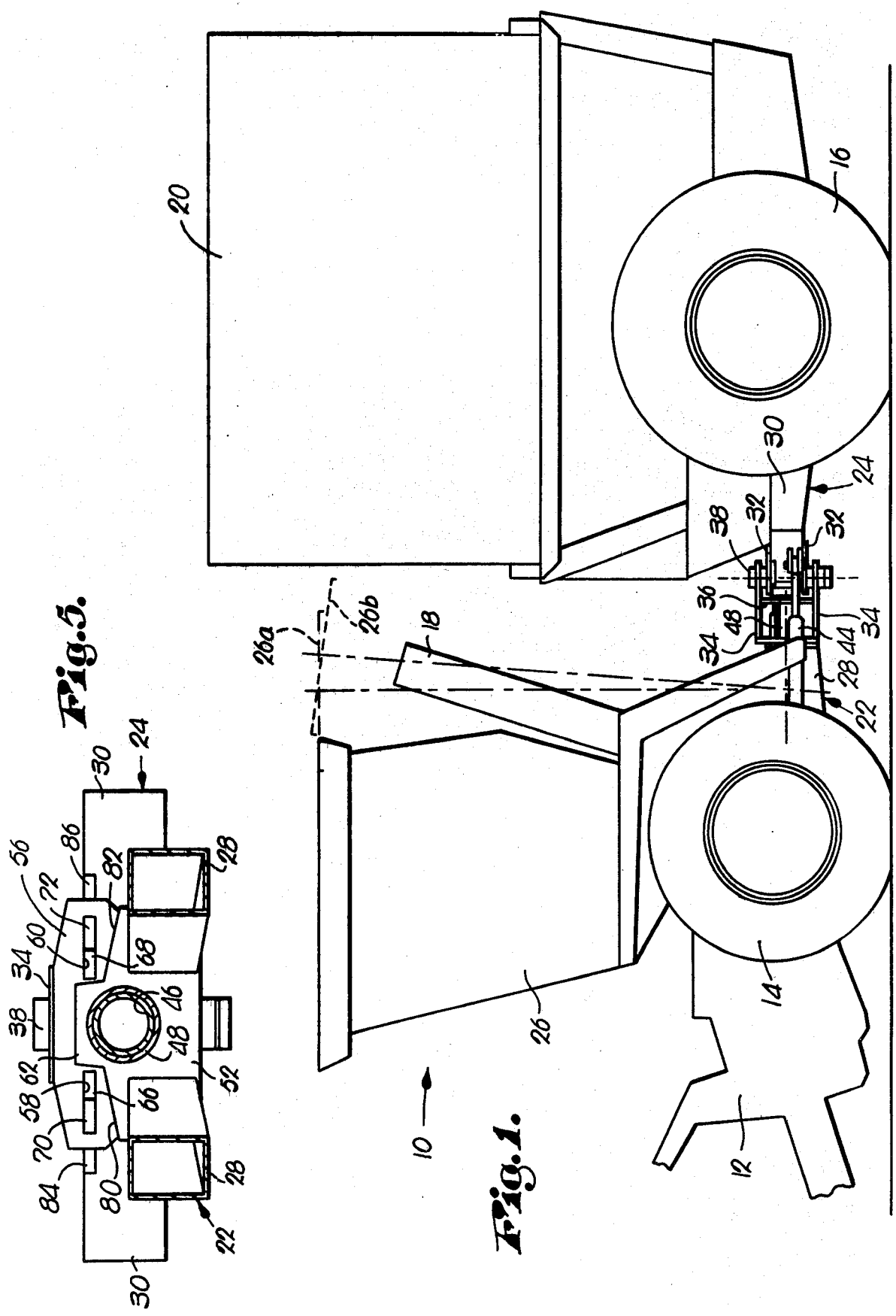

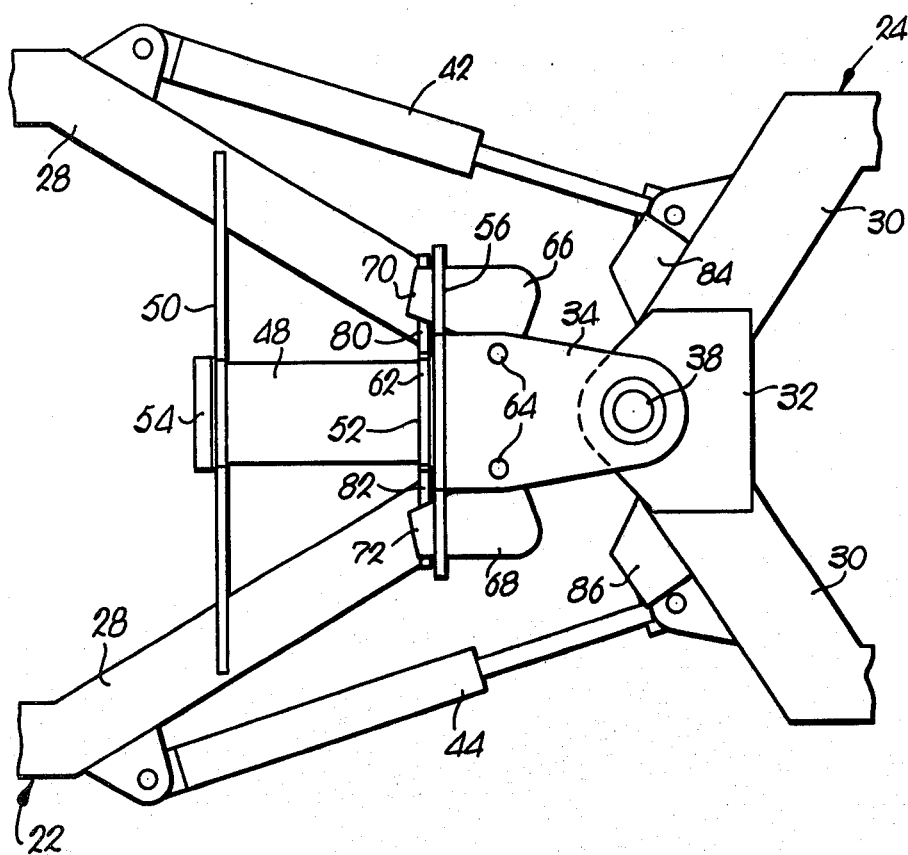
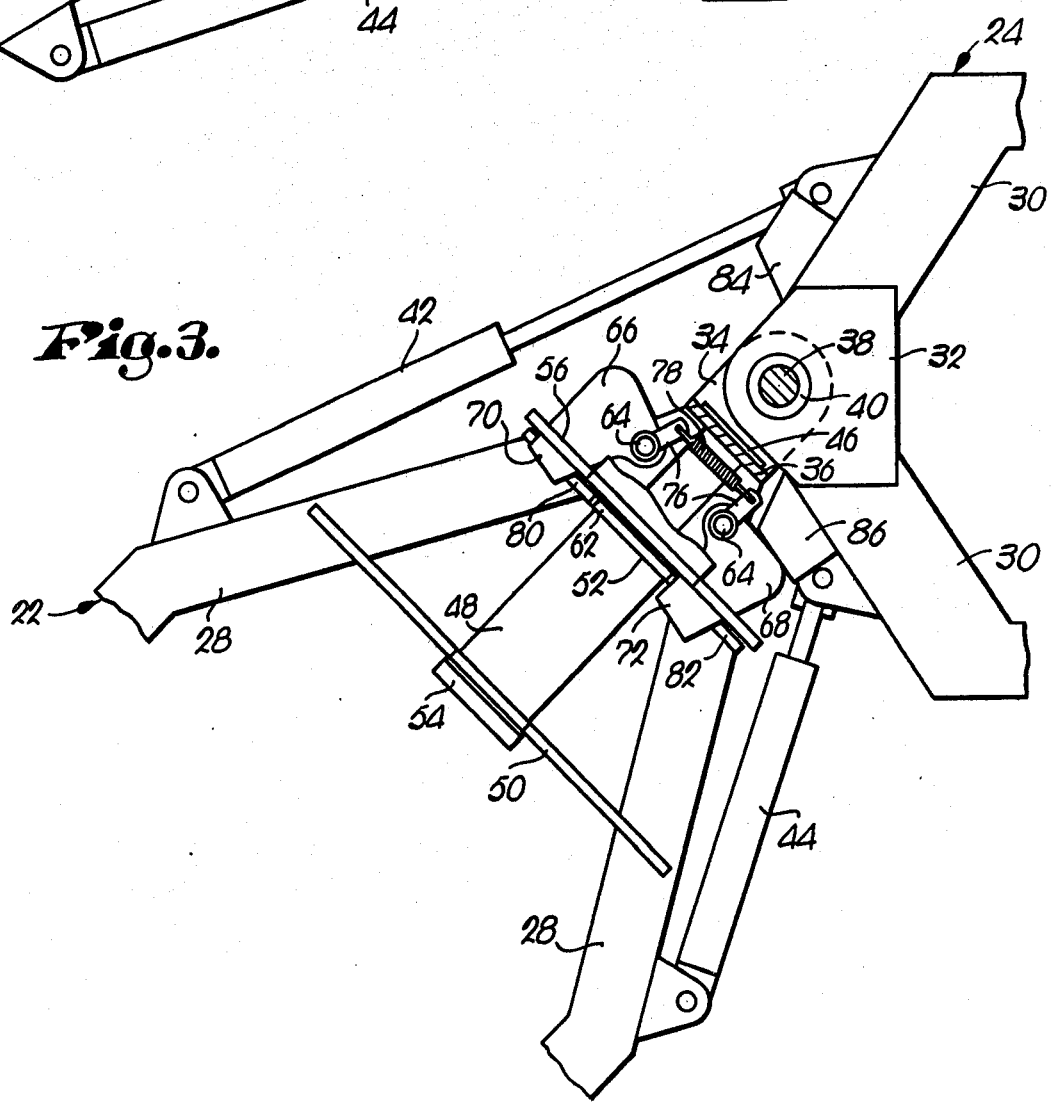

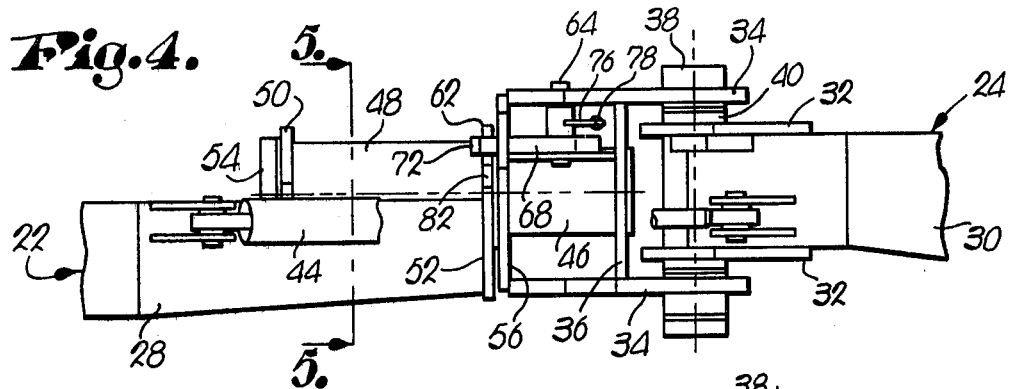
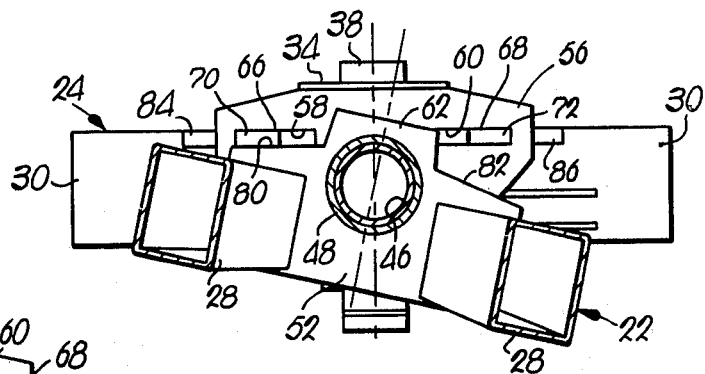
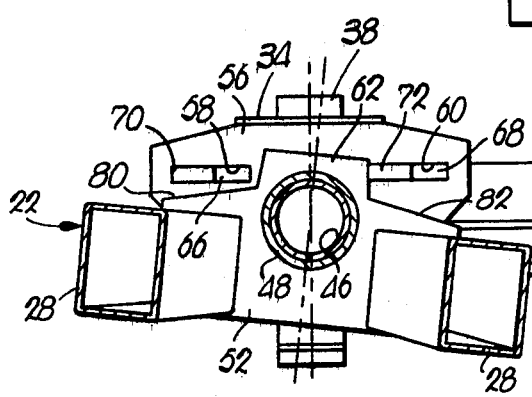
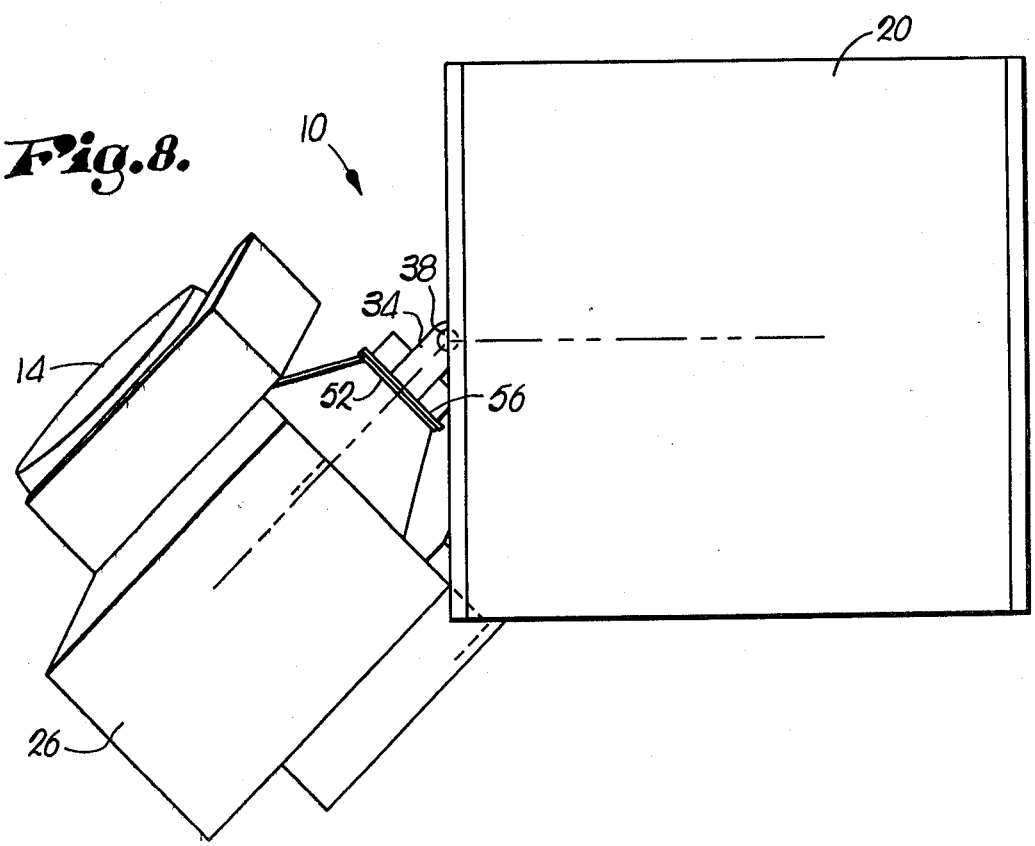

OSCILLATOR LIMIT IN ARTICULATED LAND VEHICLE

Vehicles having independent front and rear units articulated therebetween about a vertical axis and adapted for relative oscillation about a horizontal axis are becoming increasingly important in the agricultural implement field. The requirements include the need for execution of relatively sharp turns on the one hand and the necessity, at the same time, of accommodating for uneven terrain on the other hand, all the while eliminating undue spacing between the units. When the lead unit is used to support crop severance mechanisms, good, relatively low, even cutting cannot be obtained if such mechanisms cannot properly tilt as the lead unit encounters ridges and depressions, including those which result from contour farming. Many such machines carry operator's cabs and bins for receiving harvested crops or other equipment which interengage and become damaged if tilting movements are unrestricted during turning.

According to my invention, therefore, a pair of wheel-supported frames are articulated by pivotally interconnected coupling links with steering of the front frame being effected by use of hydraulic cylinders between the frames such as to permit rather sharp turn around in both directions at the end of the rows. At the same time, the steerable frame oscillates about a fore and aft axis so as to permit it to tilt in both directions, limited by properly located stops.

The arrangement is such as to render it especially adaptable for self-propelled forage harvesters having headers on the front unit which must cut the crops rather low to the ground. The severed crop is then chopped and directed upwardly and rearwardly into a receiving bin on the rear unit. By use of my improvements the steered front unit may be caused to turn within certain limits without danger of cab-bin interengagement notwithstanding the extent of tilting of the front unit.

During the turns, limit members are actuated as they engage the rear frame such as to swing into position for preventing undue tilting. The bin-cab relationship is such as to permit full turns without interference when operating on level terrain. However, as the tilting increases, the extent of permissable turning decreases to keep the cab and bin out of damaging interengagement. Thus, to solve the problem, I progressively decrease the extent to which the front frame may tilt as the turns increase toward the maximum amount.

In the drawings:

FIG. 1 is a side elevational view of an articulated, self-propelled harvester having the oscillator limit structure embodying the principles of my present invention;

FIG. 2 is an enlarged, fragmentary, plan view of the oscillator-articulation construction shown in FIG. 1, as the component parts appear during travel of the vehicle along a straight path over even terrain;

FIG. 3 is a view similar to FIG. 2 showing the components of the latter during turn around in one direction with the extent of tilt limited in one direction;

FIG. 4 is a fragmentary, side elevational view similar to FIG. 1 showing the component parts of FIGS. 2 and 3;

FIG. 5 is a cross-sectional view taken on line 5—5 of FIG. 4;

FIG. 6 is a view similar to FIG. 5 showing the tilting limit in one direction during travel along a straight course or with less than full turn;

FIG. 7 is a view similar to FIG. 6 showing position of the parts during full turn in one direction with full oscillatory limit; and FIG. 8 is a schematic, plan view of the vehicle shown in FIG. 1 showing full turn around in one direction in absence of cab-bin interference as a result of my oscillator limit improvement.

The mobile vehicle 10 chosen for illustration of the concepts of my present invention may be in the nature of a self propelled forage harvester somewhat similar to the machine illustrated in U.S. Pat. No. Des. 223,466 including as in said patent, a header 12, a front wheel and axle assembly 14, a rear wheel and axle assembly 16, an upwardly and rearwardly directed discharge spout 18 for chopped material, a cutting cylinder (not herein shown) carried by the assembly 14 and a prime mover (not herein shown) carried by the assembly 16. See U.S. Pat. No. 4,011,998 for an example of a cutting cylinder for such harvesters. Examples of headers are also disclosed in U.S. Pat. Nos. 3,818,685; 3,670,590; 3,736,733; 3,866,399 and 4,084,396. U.S. Pat. No. 3,796,029 shows row crop gathers and dividers for the header 12. In my instant illustration the assembly 16 also supports a bin 20 for receiving the crop from the spout 18 which may, if desired, be comparable to that disclosed in U.S. Pat. No. 3,753,593.

As distinguished, however, from U.S. Pat. No. Des. 223,466, the assemblies 14 and 16 are provided with two independent frames 22 and 24 respectively, the former of which has an operator's cab 26 thereon. Shown best in FIGS. 2 and 3 are a pair of rearwardly converging portions of the frame 22 and a pair of forwardly converging portions 30 of the frame 24, the portions 30 terminating in a pair of vertically spaced, rigidly secured coupling links 32 (see also FIG. 4).

A pair of vertically spaced coupling links 34, joined by an upstanding element 36 therebetween, is also provided for the frame 22, and the links 32 and 34 are interconnected by a normally upright shaft 38 within a sleeve 40, articulating the frames 22 and 24. For steering purposes, the frame 22 may be turned relative to the frame 24 about the axis of the shaft 38 by actuation of a pair of fluid pressure piston and cylinder units 42 and 44 pivotally interconnecting the frames 22 and 24 and controlled by an operator within the cab 26. The pivots for each assembly 42 and 44 are of such conventional nature as to permit lateral tilting of the frame 22 over uneven terrain.

Such oscillation of the frame 22 is permitted by the provision of a pair of relatively telescoped tubes 46 and 48, normally disposed with their longitudinal axes extending horizontally fore and aft of the vehicle 10 along the center line of the latter such that the rearwardly extended axis of the inner tube 46 intersects the axis of the shaft 38 (see FIG. 3). The outer tube 48 is rigid to a cross bar 50 interconnecting the frame portions 28 and is also rigid at its rear end to an upstanding plate 52 firmly attached to the rear ends of the frame portions 28 (see, e.g. FIGS. 6 and 7). The inner tube 46, rotatably receiving the tube 48, extends rearwardly beyond the tube 48 and thence through the element 36 to which it is affixed. A screw-threaded retaining ring 54 is provided on the forwardmost end of the tube 46.

A second upstanding plate 56 immediately behind the plate 52 and parallel thereto, is welded or otherwise rigidly attached to the tube 46 and to the forwardmost ends of the links 34. The plate 56 has a pair of laterally spaced, normally horizontal slots 58 and 60, and an upstanding protuberance 62 on the plate 52 directly above the tube 48 is disposed between the slots 58 and 60 (FIG. 5).

Suspended from the upper link 34 by pivot pins 64 are a pair of swingable limit members 66 and 68 having toes 70 and 72 respectively, it being noted that the members 66 and 68 progressively decrease in width as the forwardmost ends of their toes 70 and 72 are approached, and that the toes 70 and 72 extend through the slots 58 and 60 respectively such that the protuberance 62 extends between the toes 70 and 72.

The members 66 and 68 have hubs 74 rigid thereto and rotatable on the pins 64, each hub 74 being provided with a crank 76, and the cranks 76 are joined by a spring 78. The plate 52 has inclined, uppermost edges 80 and 82 underlying the toes 70 and 72 respectively, the edges 80 and 82 converging upwardly and inwardly as the tube 48 is approached. The rear frame portions 30 are provided with stop lugs 84 and 86 in the same horizontal plane as the members 66 and 68 respectively.

OPERATION

During forward travel of the vehicle 10, right to left viewing FIG. 1, along a straight course of travel over level ground, powered by the ground wheels of the assemblies 14 and 16 and guided by operator control of the units 42 and 44, all components above described are in the condition shown in FIGS. 1, 2, 4 and 5. The toes 70 and 72 extend forwardly equal distances beyond the front face of the plate 52 (FIG. 2), held toward the outer ends of the slots 58 and 60 (FIG. 5) by the spring 78 (FIG. 4), the edges 80 and 82 are equally spaced from the lower faces of the toes 70 and 72 and the protuberance 62 is equally spaced from the inner edges of the toes 70 and 72 inasmuch as the longitudinal axis of the elongated plate 62 is horizontally disposed (FIG. 5).

While the units 42, 44 remain equally extended, the frame 22, and therefore, the header 12, the assembly 14 and the cab 12 may tilt laterally in both directions with respect to the links 34 in response to travel over uneven terrain. Manifestly, therefore, such oscillation about the axis of the tube 46, is with respect also to the frame 24, the assembly 16 and the bin 20. The tilting is, however, limited (to 12 degrees, for example), in each direction by the relationship of the plate 52 to the toes 70 and 72. In FIG. 6, the plate 52 is shown tilted in one direction, with its edge 80 horizontally disposed, in engagement with the lower face of the toe 70. When the frame 22, and therefore, the plate 52 tilts in the opposite direction (not shown) the edge 82 of the plate 52 abuts the bottom of the toe 72.

Turning of the vehicle 10 on level ground to a maximum extent (of 45 degrees for example) in both directions is limited by the members 66 and 68 moving into engagement with the lugs 84 and 86. Such engagement swings the members 66 or 68 (as the case may be) about the pins 64 against the restoring action of the spring 78 to cause the members 66 and 68 to protrude forwardly farther beyond the front face of the plate 56 as seen for instance in FIG. 3 with respect to member 68 when the turn is to the left.

Viewing FIG. 3, the unit 44 is shown retracted, effecting a full 45 degree left hand turn about the shaft 38 with the member 68 abutting the lug 86 such that the toe 72 extends deeply into the slot 60 as the spring 78 holds the toe 70 toward the outer end of the slot 58 (see also FIG. 7). Assuming a 45 degree turn with the member 68 disposed as shown in FIG. 3, the extent of tilt is limited (to 6 degrees, for example), by the protuberance 62 coming into engagement with the inner edge of the toe 72 as shown in FIG. 7. Under such conditions, there is no danger of the cab 26 swinging into engagement with the bin 20 as illustrated by FIG. 8 (the dashed lines in FIG. 8 show the cab-bin interference which would occur without the tilt limit).

Conversely, opposite turns cause the protuberance 62 to engage the toe 70 as is quite clear from the drawings. However, in both directions of turn, the tilting limits, in both directions, are progressive from 12 degrees to 6 degrees during turns from FIG. 2 to a full 45 degrees. Considering the configurations of the members 66 and 68 and their axes 64 of swinging movement, the deeper the toes 70 and 72 penetrate the slots 58 and 60 the less the permitted tilt, e.g. from 12 degrees to 6 degrees during turns up to approximately 45 degrees.

It is contemplated that turns up to about 34 degrees may be effected before the members 66 and 68 first engage the lugs 84 and 86, during which period of movement, the members 66 and 68 have no limiting effect on the extent of tilt. Thereafter, during turns from 34 degrees to 45 degrees, the members 66 and 68 gradually reduce the extent of tilt to a maximum of about 6 degrees.

In the event the frame 22 is in a 12 degree tilt (limited by the edges 80 or 82) prior to reaching the 34 degree turn, such that the members 66 and 68 are unable to thereafter reduce the tilt to less than 12 degrees, the extent of turn beyond 34 degrees is precluded thereby preventing any contact of the cab 26 against the bin 20.

Accordingly, under all conditions likely to be encountered during use of the vehicle 10, equipment carried by the frames 22 and 24 thereabove, such as cab 26 and bin 20, are protected as the frame 22 is turned either to the left or to the right.

The horizontal phantom line 26a in FIG. 1 represents the upper rear edge of the cab 26 when the latter is turned 45 degrees with no tilt. On the other hand, the inclined phantom line 26b on FIG. 1 represents the same upper rear edge of the cab 26 when the latter is also tilted to the maximum position permitted during a 45 degree turn (6 degrees).

I claim:
1. In a mobile vehicle,
  a pair of independent frames each provided with a wheel and axle assembly in supporting relationship thereto;
  means interconnecting the frames for articulation relatively about a normally upright axis;
  steering means for effecting turning movement of one of the frames about said axis;
  means effecting oscillatory movement of said one frame relative to the other frame about a normally horizontal axis extending fore and aft of the vehicle, permitting tilting of said one frame in opposite directions over uneven terrain;
  means limiting the extent of said tilting in both directions and in all steered positions of said one frame regardless of ground contour; and
  means for progressively decreasing said extent of tilting in both directions as the one frame is turned a predetermined distance to the left or to the right.
2. The invention of claim 1, said articulation means including a pair of pivotally interconnected coupling links, one for each frame respectively, there being a first upright device rigid to said one frame and a second upright device rigid to the link of said one frame, said limiting means being on said devices.

3. The invention of claim 2, said first and second devices being a front and a rear plate, said front plate being tiltable with the one frame relative to the rear plate.

4. The invention of claim 3, said front plate having a pair of spaced apart, upper edges, said rear plate having a pair of spaced members overlapping corresponding, respective edges of the front plate and disposed for engagement with alternate ones of said edges during tilting of said one frame.

5. The invention of claim 3, said rear plate having a pair of spaced members overlapping the front plate, said one plate having an upstanding protuberance between the members.

6. In an agricultural implement,
- a front and a rear frame each provided with a wheel and axle assembly in supporting relationship thereto;
- a cab carried by the front frame;
- a bin carried by the rear frame;
- a first coupling link rigid to the rear frame;
- a second coupling link having pivot means connecting the same to the first link for articulation about a normally upright axis;
- steering means interconnecting the frames for effecting turning movement of the front frame relative to the rear frame about said pivot means;
- an upright plate rigid to the second link and provided with a pair of spaced slots;
- another upright plate rigid to the front frame and provided with an upstanding protuberance;
- a fore and aft pivot assembly rotatably connecting the second link with said front frame for lateral oscillation of the front frame relative to the rear frame about a fore and aft axis;
- a shiftable member extensible through each slot respectively into the path of oscillation of said protuberance for limiting the extent of oscillation of the front frame during turning of the latter; and
- lug means on the rear frame disposed for engagement by the shiftable members for extending the latter into said path after turning of the front frame a predetermined amount in either direction whereby to preclude engagement of said cab with said bin.

7. The invention of claim 6, said members being carried by said second link for swinging movement about axes parallel with the axis of said pivot means.

8. The invention of claim 6, said another plate having stop means engageable with said members for limiting the amount of said oscillation throughout the entire extent of said turning.

9. The invention of claim 7, said stop means being a pair of opposed edges on said another plate inclined downwardly and outwardly from said protuberance.

* * * * *